(12) United States Patent
Arato

(10) Patent No.: US 6,192,498 B1
(45) Date of Patent: Feb. 20, 2001

(54) SYSTEM AND METHOD FOR GENERATING ERROR CHECKING DATA IN A COMMUNICATIONS SYSTEM

(75) Inventor: Lazslo Arato, Tinton Falls, NJ (US)

(73) Assignee: Globepan, Inc., Red Bank, NJ (US)

( * ) Notice: Under 35 U.S.C. 154(b), the term of this patent shall be extended for 0 days.

(21) Appl. No.: 09/164,921

(22) Filed: Oct. 1, 1998

Related U.S. Application Data

(60) Provisional application No. 60/060,651, filed on Oct. 1, 1997.

(51) Int. Cl.[7] ................................................... H03M 13/00
(52) U.S. Cl. ............................................. 714/781; 714/758
(58) Field of Search .................................... 714/781, 782, 714/783, 784, 807, 808, 809, 810, 758, 752, 52, 800, 801, 757

(56) References Cited

U.S. PATENT DOCUMENTS

| | | | |
|---|---|---|---|
| 5,325,372 | * | 6/1994 | Ish-Shalom .......................... 714/757 |
| 5,638,370 | * | 6/1997 | Seconi et al. ......................... 370/466 |
| 5,671,237 | * | 9/1997 | Zook ..................................... 714/755 |
| 5,870,413 | * | 2/1999 | Kodama et al. ..................... 714/758 |

OTHER PUBLICATIONS

Al Chamé, "Applications Information Interfacing the 68360 (QUICC) to T1/E1 Systems," Motorola Semi-conductor Technical Information, pp. 1–18, 1993.

"Communications Processor Module (CPM)," Motorola MC68360 Quad Integrated Communications Controller User's Manual, rev. 1, ch. 7, Dec. 4, 1996, pp. 7–1–7–381.

* cited by examiner

*Primary Examiner*—Christine T. Tu
(74) *Attorney, Agent, or Firm*—Thomas, Kayden, Horstemeyer & Risley

(57) ABSTRACT

A circuit and method for generating cyclic redundancy check (CRC) data is disclosed. In one embodiment, the circuit interfaces with a data bus with other processor components. The circuit includes an input first-in-first-out (FIFO) to interface with the data bus, a configuration register electrically coupled to the data bus, and a configurable CRC generation circuit electrically coupled to the data bus and to the configuration register. The CRC generation circuit includes a bit shift register which is configurable to generate CRC data for multiple protocols. To accomplish this, the bit shift register is configurable for different lengths, the actual length of the bit shift register being determined by the data communication protocols employed.

11 Claims, 8 Drawing Sheets

SYSTEM AND METHOD FOR GENERATING ERROR CHECKING DATA IN A COMMUNICATIONS SYSTEM

CROSS REFERENCE TO RELATED APPLICATIONS

This application claims the benefit of United States provisional patent application entitled "Programmable Framer for HDSL Transmissions" filed on Oct. 1, 1997 and afforded Ser. No. 60/060,651, the entire text of which is incorporated herein by reference.

STATEMENT REGARDING FEDERALLY SPONSORED RESEARCH OR DEVELOPMENT

Not Applicable.

TECHNICAL FIELD

The present invention relates to the field of data communications, and more particularly, to the field of framing data in a communications system.

BACKGROUND INFORMATION

In data communications, data is generally transmitted in a bit-serial communications format through current networks. It is often the case that the data to be transmitted between two data endpoints is packaged according to specific data communications protocols to facilitate the transmission across the particular network in question. This packaging may include the addition of network management and other information such as headers and trailers to the data to facilitate transmission based upon the dictates of the particular protocol employed. Such packaging is generally termed "framing" in the art.

Some of these protocols may include, for example, data transmission using time division multiplexing (TDM) approaches such T1 and E1 standards known in the art. Other example standards may include high-level data link control (HDLC) or asynchronous transfer mode (ATM). Each of these protocols have their own applications and goals in terms of history, performance, error-immunity, flexibility, and other factors. Consequently, each of these protocols employ framing procedures by which data is packaged for transmission across the various networks employed. These protocols are generally incompatible and require translation or conversion to transmit data in a transmission link that employs two or more protocols in two or more different segments.

The conversion from one protocol to another requires specific framing technology to accomplish the task. With a myriad of standards between which conversion is possible, many different dedicated protocol conversion units have been developed to accomplish the specific conversion tasks presented. The typical protocol conversion unit is labeled "dedicated" above because such units generally employ dedicated circuits which are capable only of performing the conversion from one specific protocol to another. The result of this fact is a multitude of protocol conversion units on the market to accomplish the individual conversion tasks, thereby diminishing efficiencies to be obtained by mass production.

It is also the case that new communications standards are developed as data communication technology develops over time. Often times, a particular standard may be in flux while discussion ensues among those skilled in the art until agreement on concrete provisions articulating a standard is reached. Consequently, it is difficult to develop data communications technology that employs an up and coming standard until the standard is settled. In the competitive world of data communications technology production, it is desirable to produce products to meet these new standards as quickly as is possible after a standard is finalized so as to compete in the marketplace.

BRIEF SUMMARY OF THE INVENTION

In light of the foregoing, it is an objective of the present invention to provide for technology which can achieve protocol conversions between any number of protocols to obtain the efficiencies of mass production and feature the flexibility allowing the unit to be quickly adapted to new data communications protocols as they develop. In addition, there is a corresponding objective to provide for circuits which can perform specific tasks in conjunction with the aforementioned protocol conversions, such as, for example, a circuit to generate cyclic redundancy check data information.

In furtherance of these and other objectives, the present invention entails a circuit and method for generating cyclic redundancy check (CRC) data. In one embodiment, the circuit interfaces with a data bus and other processor components. The circuit includes an input first-in-first-out (FIFO) to interface with the data bus, a configuration register electrically coupled to the data bus, and a configurable CRC generation circuit electrically coupled to the data bus and to the configuration register. The CRC generation circuit includes a bit shift register which is configurable to generate CRC data for multiple protocols. To accomplish this, the bit shift register is configurable for different lengths, the actual length of the bit shift register being determined by the data communication protocols employed. The bit shift register also features multiple inputs to allow the CRC generation circuit to employ any CRC generation polynomial based on the data communications protocols. The CRC generation circuit also provides and additional advantage in that the bit shift register can be configured into multiple registers to use in ATM signal synchronization.

The present invention may also be viewed as a method for generating CRC data which comprises the steps of receiving a data input from a data bus, generating a CRC configuration control signal based upon the data input using a predetermined data communications protocol, and generating CRC data based upon the CRC configuration control signal, the CRC data being transmitted to the data bus.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION OF THE INVENTION

Figure 1:
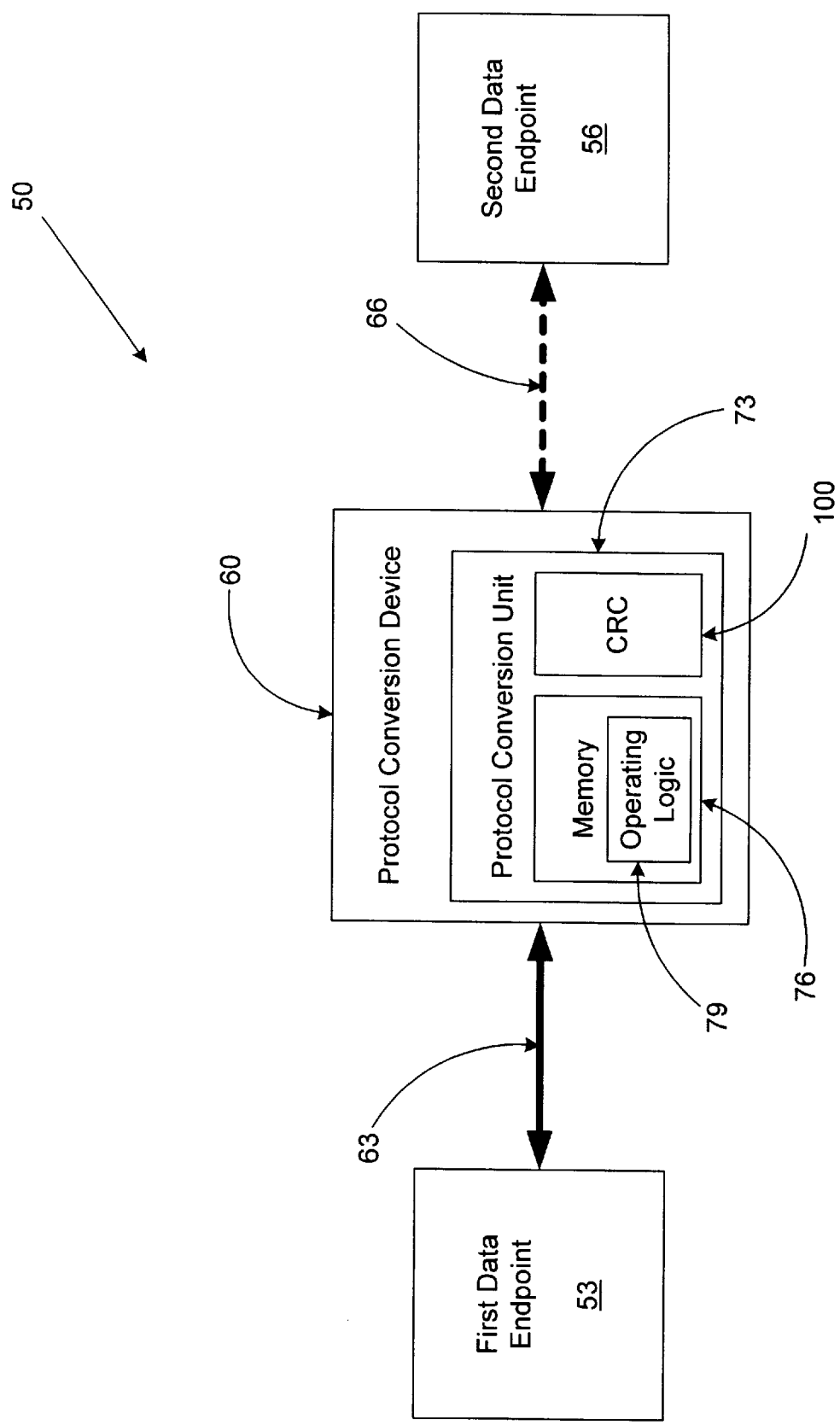
FIG. 1 is a block diagram of a communications system according to an embodiment of the present invention.

Turning to FIG. 1, shown is a communications system 50 according to the present invention. The communications system 50 includes a first data endpoint 53 and a second data endpoint 56. The first and second data endpoints 53 and 56 may be, for example, a modem, data terminal equipment or apparatus. The first and second data endpoints 53 and 56 establish data communications with each other through the protocol conversion device 60 via a bi-directional data stream. However, the first data endpoint 53 communicates the data stream using a first data communications protocol 63, and the second data endpoint 56 communicates the data stream using a second data communications protocol 66, where the first and second data communications protocols are incompatible.

The protocol conversion device 60 includes a protocol conversion unit 73 which converts the data stream from the first data communications protocol 63 to the second data communications protocol 66 and vice versa. The protocol conversion unit 73 is programmable to perform the protocol conversions in a manner similar to the data communications protocol unit 73 disclosed in United States Patent Application entitled "System and Method for Protocol Conversion in a Communications System", filed on even data herewith, and assigned Ser. No. 09/164,969, the entire text of which is incorporated herein by reference. The protocol conversion unit 73 further includes a memory 76 on which operating logic 79 is stored, the operating logic 79 being executed by the protocol conversion unit 73. A cyclic redundancy check (CRC) circuit 100 also included in the protocol conversion unit to generate error correction data and other functions as will be described.

Figure 2:
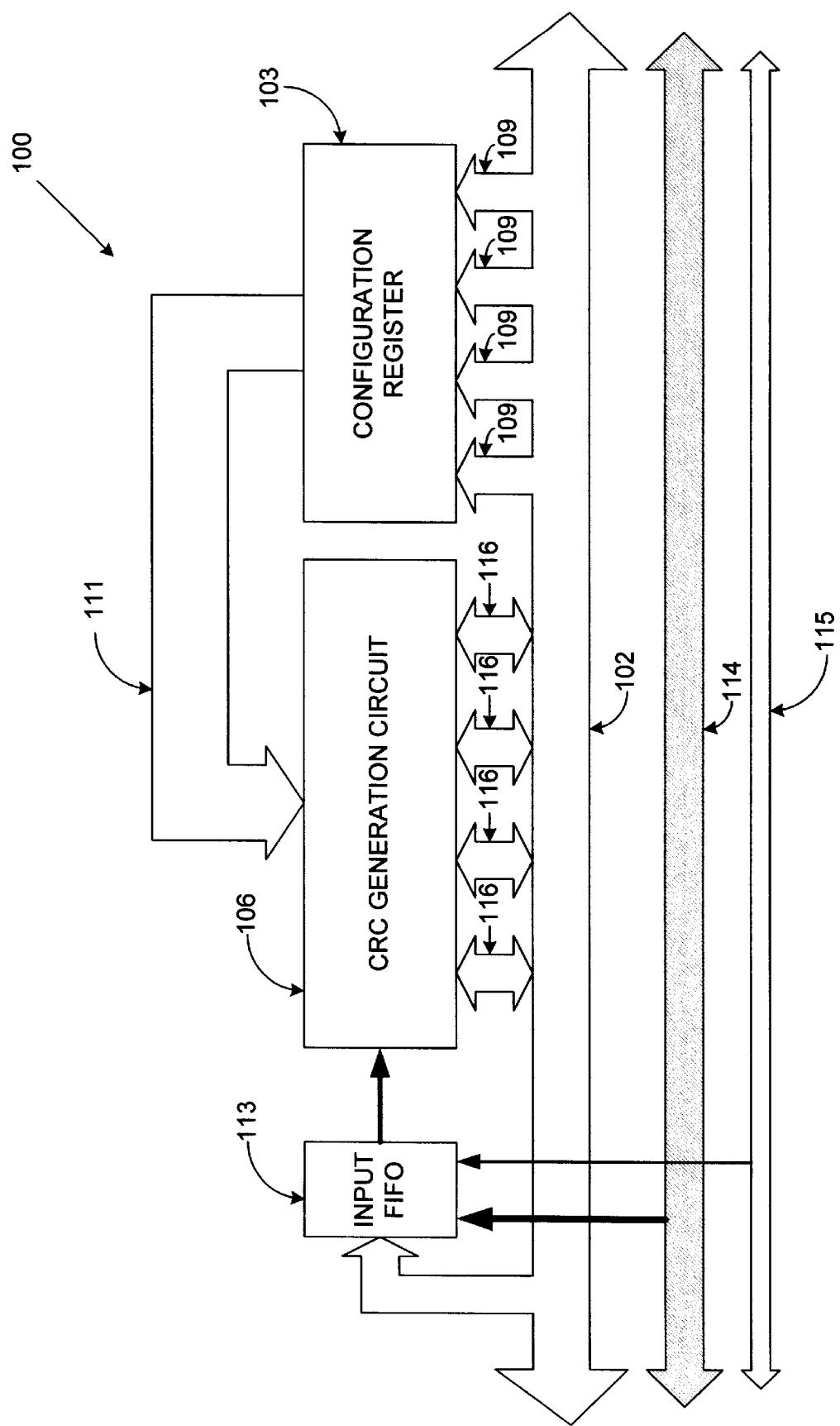
FIG. 2 is a block diagram of the cyclic redundancy check circuit used in the communications system of FIG. 1.
Figure 3A:
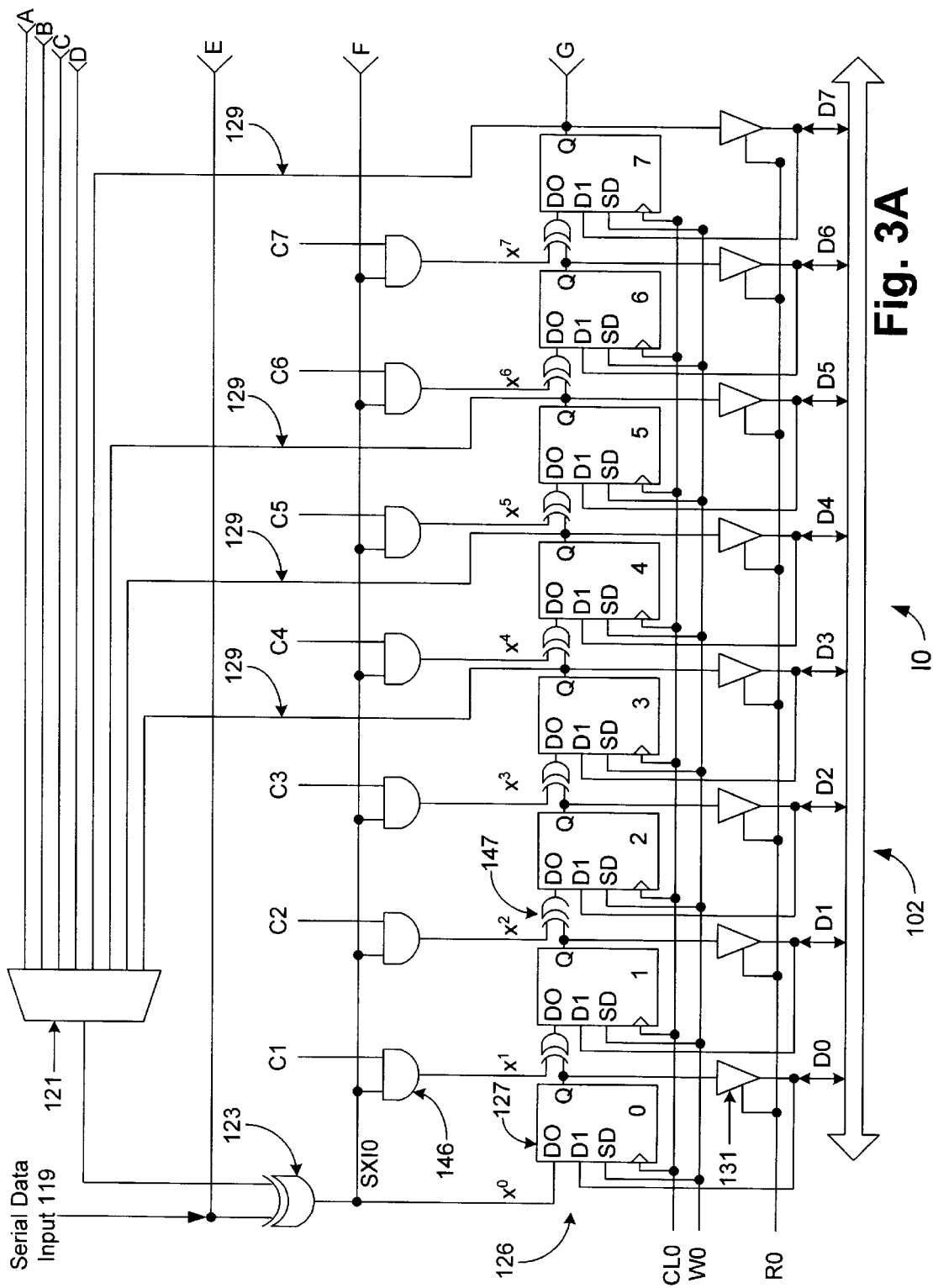
FIGS. 3A–3D are a schematic of the configurable cyclic redundancy check generator of FIG. 2.
Figure 3B:
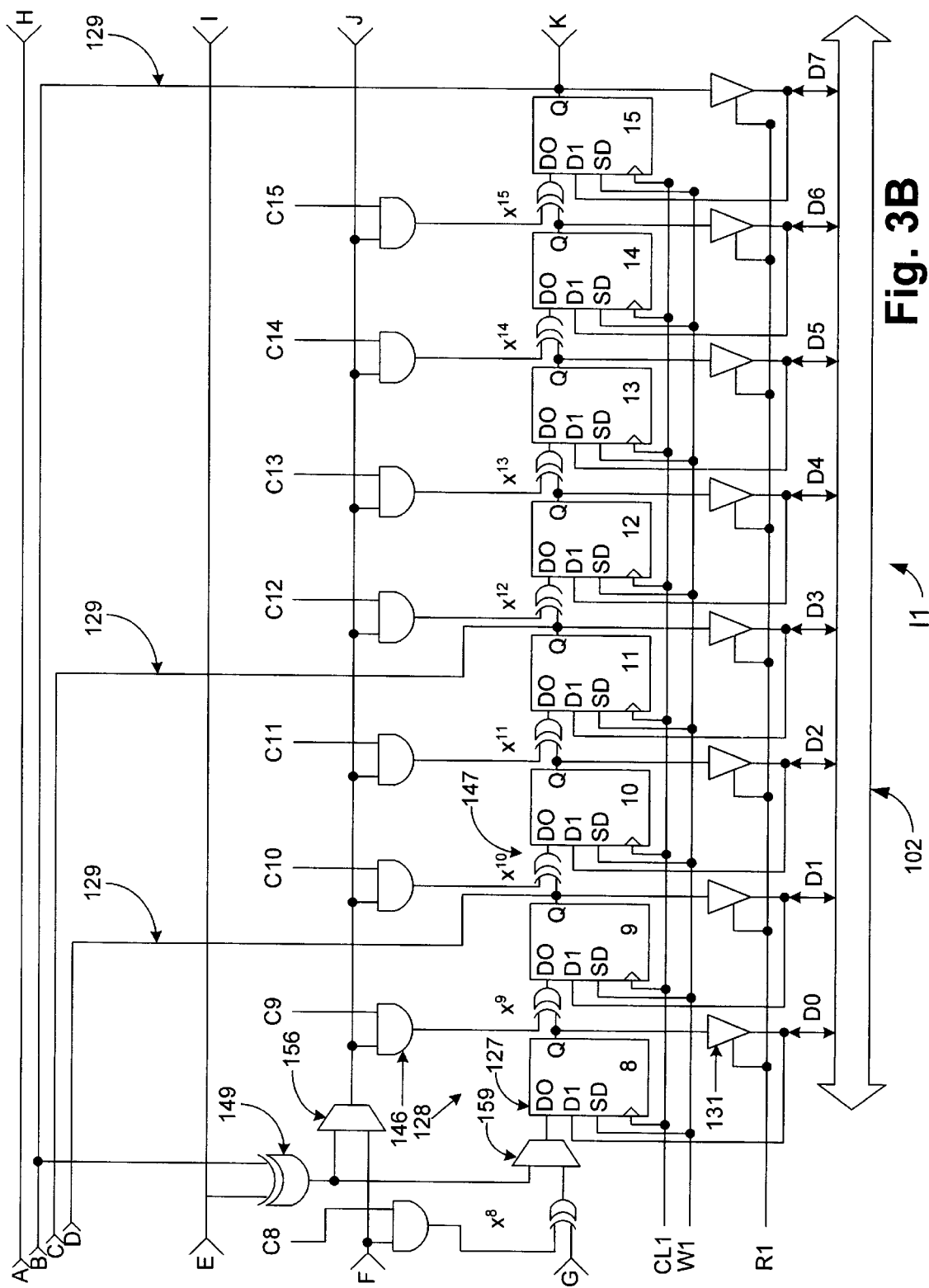
Figure 3C:
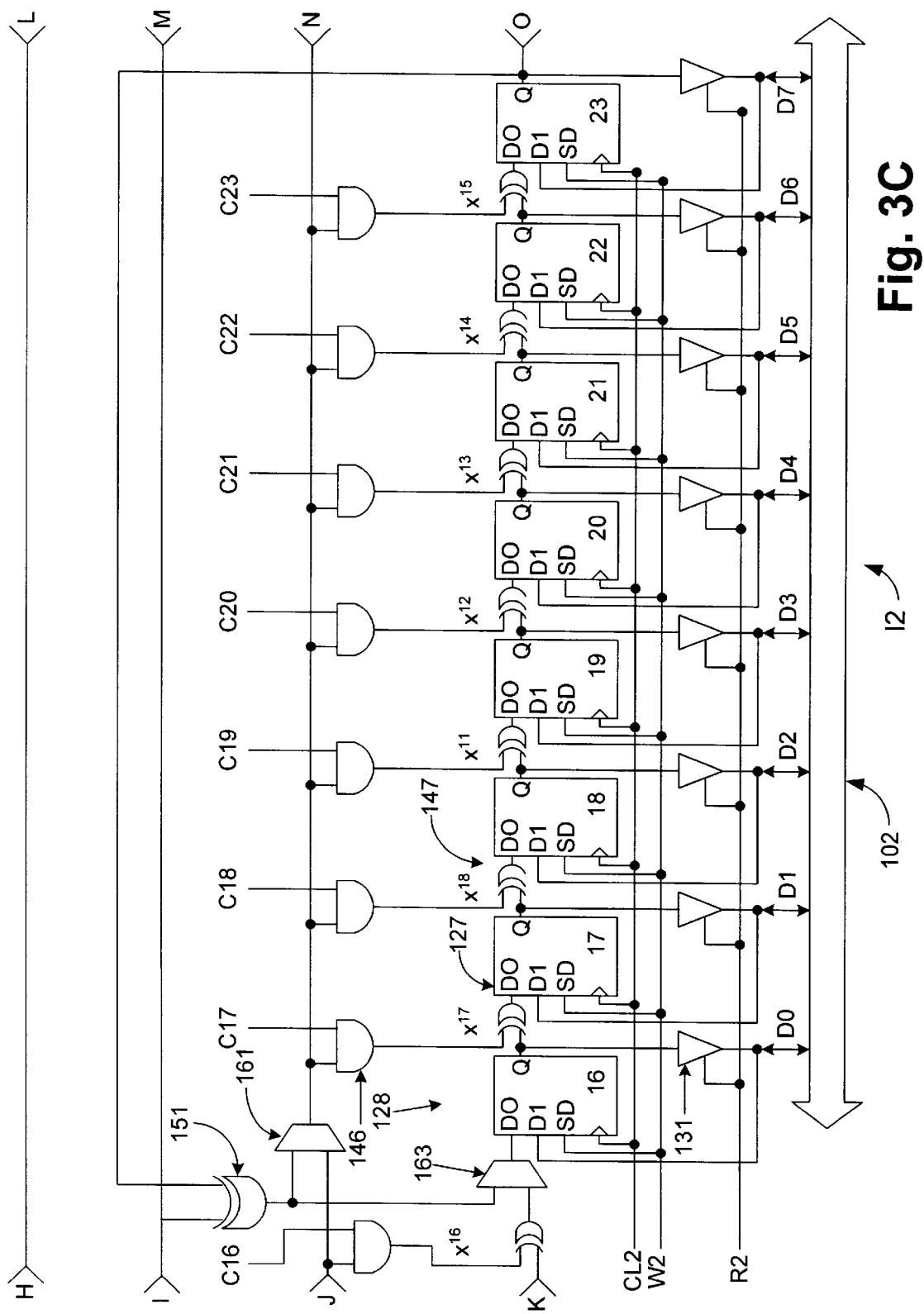
Figure 3D:
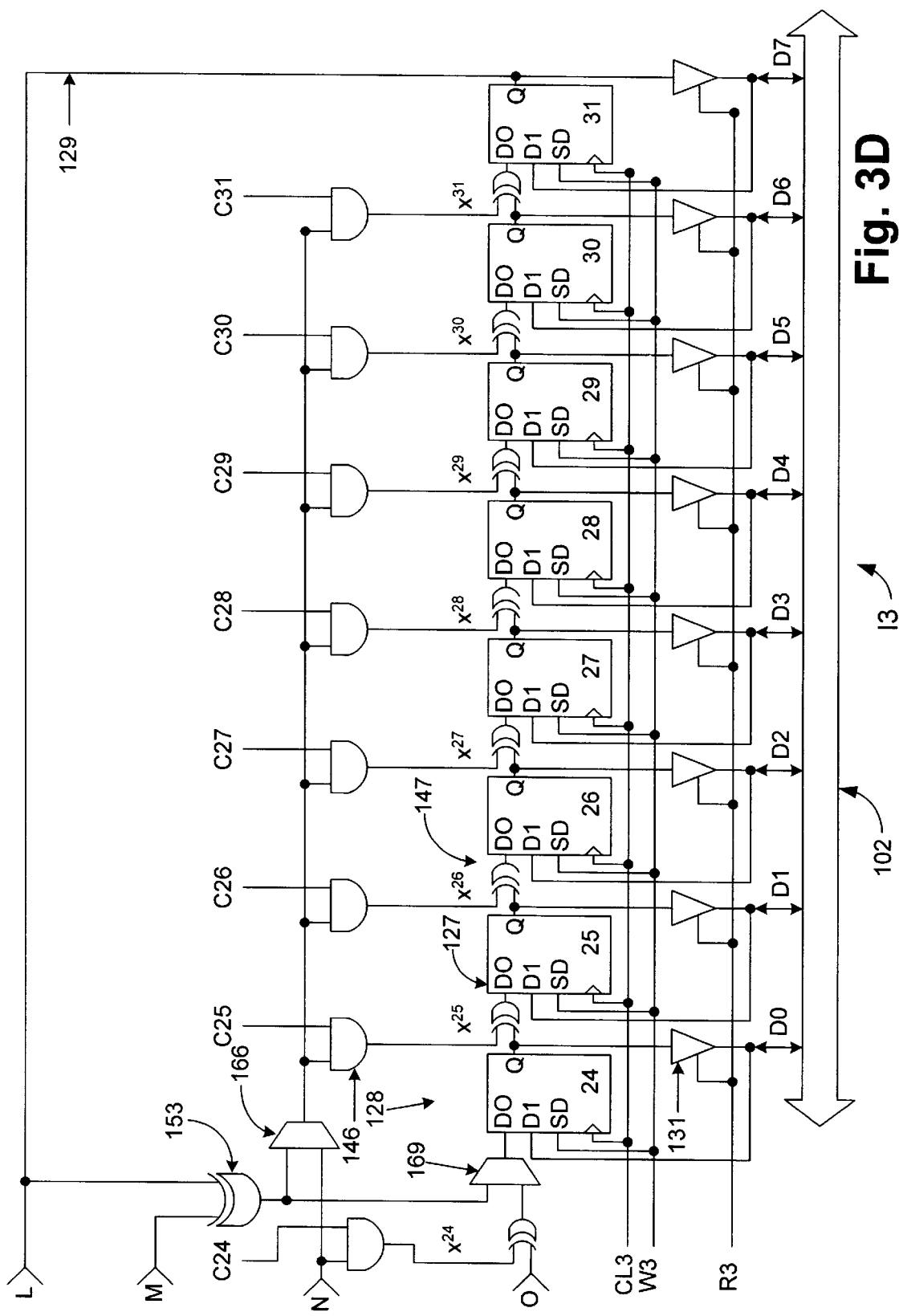

Turning to FIG. 2, shown is a cyclic redundancy check (CRC) circuit 100 according to an embodiment of the present invention. The CRC circuit 100 is advantageously designed to generate error checking information to be transmitted with corresponding data for a multitude of specified data communications protocols. The CRC circuit 100 may be electrically coupled to a data bus 102, for example, in the protocol conversion unit 73.

The cyclic redundancy check circuit 100 features a configuration register 103 and a CRC generation circuit 106. The configuration register 103 receives data from the data bus through the CRC configuration input connection 109. The configuration data is applied to the configuration register 103 through the data bus 102 to create a particular CRC configuration which is communicated to the CRC generation circuit 106 through the configuration bus 111. The configuration bus 111 comprises multiple conductors to properly configure the CRC generation circuit 106 as will be discussed.

A CRC input FIFO 113 is electrically coupled to the data bus 102, a shadow bus 114, and a bit bus 115. Data may be received from the data bus 102 or the bit bus 115 and then relayed in series to the CRC generation circuit 106. The shadow bus 114 is employed to facilitate a partial parallel write to the CRC input FIFO 113 as will be discussed. In addition, a single data bit may be written from the bit bus 115 into the input FIFO 113 using a "bit command". The output of the CRC generation circuit 106 is made available to the data bus 102 via the multiple CRC outputs 116, where each CRC output 116 has the same width or number of bits as the data bus 102.

The general operation of the CRC circuit 100 is now described. A specific configuration code which is based on the type of protocol conversion to be performed is input into the configuration register 103 from the data bus 102. The configuration register 103 enables various components of the CRC generation circuit 106 to perform the desired cyclic redundancy check processing function using the data received as required by the particular protocol conversion being performed. At the beginning of a data frame, the CRC generation circuit 106 is cleared with either a "clear CRC" signal, or by writing zero values from the data bus 102 into the CRC generation circuit 106. Thereafter, serial data for one frame is read into the CRC generation circuit 106 from the CRC input FIFO 113 and is processed by the CRC generator circuit 106. After performing the CRC operation for all the data of a single frame, the CRC output is made available on the data bus 102 via the CRC outputs 116.

Referring next to FIGS. 3A through 3D, shown is a schematic of the CRC generation circuit 106 of FIG. 2. The CRC generation circuit 106 has a serial data input 119 from the CRC input FIFO 113 (FIG. 2) which undergoes a modulo-2 operation with the output of the feedback multiplexer 121 using the first XOR gate 123. The output of the first XOR gate 123 is coupled to a bit shift register 126 which comprises a number of D-type flip-flops 127. Every flip-flop 127 functions as a register position 128 or delay element in the bit shift register 126. Each register position 128 of the bit shift register 126 is triggered by a common clock indicated by CLO through CL3. Each flip-flop 127 takes its input from one of two sources, namely the two inputs DO and D1, transmitting the selected input from either DO or D1 to the output Q on the rising edge of the clock $CL_x$, and keeping that value stable until the next rising edge of the clock input. The signal at the selection input SD causes the flip-flop 127 to toggle between the two inputs DO and D1. Note that when a "0" is applied to the selection input SD, then the input DO is selected, and when a "1" is applied to the selection input SD, then the input D1 is selected. Note that the flip-flops 127 are numbered from 0 through 31. For purposes of the discussion that follows, the flip-flops 127 are referred to as register positions 128 of the bit shift register 126.

The output of several register positions 128 is fed back into the feedback multiplexer 121 via the feedback links 129. Specifically, the register position outputs 3, 4, 5, 7, 9, 11, 15, and 31 are all fed back into the feedback multiplexer 121 via the feedback links 129, thereby allowing the selection of the length or order of the CRC generator by selecting one of the inputs to the feedback multiplexer 121. Thus, the feedback multiplexer 121 acts as an order selection circuit which controls the order of the CRC generator.

The values held by each of the register positions 128 of the bit shift register 126 (at the outputs Q of the flip-flops 127) are electrically coupled to the data bus 102 through tri-state devices 131, the individual conductors of the data bus 102 being identified as D0–D7. Specifically, the 32 register positions are coupled to the data bus 102 by four separate 8 bit interfaces I0, I1, I2, and I3. The values which are held by the register positions 126 which correspond to the four interfaces I0, I1, I2, and I3 can be read to the data bus 102 by applying a logical "1" to the read inputs R0, RI, R2, and R3 which are selected using a control/address bus (not shown). In addition, the values on the data bus 102 can be written into one of four register position groups comprising register positions 0–7, 8–15, 16–23, and 24–31 by applying a logical "1" to one of the four write inputs W0, W1, W2, and W3. The write inputs are coupled to respective selection inputs SD and cause the values on the 8 conductors of the data bus 102 to be written to the respective flip-flops 127 at the inputs D1. Consequently, the present circuit provides the ability to read and write predetermined values to the shift bit register 126. Note that clock inputs CL0, CL1, CL2, and CL3 are supplied to the respective groups of D flip-flops to cause the D flip-flops to acquire the values at the respective selected inputs D0 or D1.

The CRC generation circuit 106 further includes a number of polynomial inputs C1–C31 from the configuration register 103 (FIG. 2). The polynomial inputs C1–C31 are applied to AND gates 146 along with the output of the first XOR gate 123. The output of each AND gate 146 is coupled to an input of a register XOR gate 147 between the corresponding register positions 128 of the bit shift register 126. The output of the AND gates 146 and the preceding register positions 128 are XOR'd, resulting in an output which is fed into the next adjacent register position 128 as shown. The polynomial inputs C1–C31 correspond to the specific values of a CRC generator polynomial which is employed for the specific protocol conversion executed by the protocol conversion unit 100 (FIG. 2) as will be discussed.

Finally, the CRC generation circuit 106 includes a second, third, and fourth XOR gates 149, 151, and 153. The second, third, and fourth XOR gates 149, 151, and 153 allow the CRC generation circuit 106 to be employed to find the header of a byte-aligned asynchronous transfer mode (ATM) data cell.

The CRC generation circuit 106 is placed in a "4×ATM" mode in which each of the XOR gates 149, 151, and 153 has one input electrically coupled to the serial data input 119. The second XOR gate 149 includes a second input which is electrically coupled to the output of the fifteenth register position 128. The third XOR gate 151 includes a second input which is electrically coupled to the output of the twenty-third register position 128, and similarly, the fourth XOR gate 153 includes a second input which is electrically coupled to the output of the thirty-first register position 128.

The output of the second XOR gate 149 is electrically coupled to an input of a first ATM multiplexer 156 and to an input of a second ATM multiplexer 159. The first ATM multiplexer 156 includes a second input which is electrically coupled to the output of the first XOR gate 123. The second ATM multiplexer 159 includes a second input which is electrically coupled to the output of the register XOR gate 147 between the seventh and eighth register position 128. The output of the second ATM multiplexer 159 is electrically coupled to the input of the eighth register position 128.

Similarly, the third XOR gate 151 is electrically coupled to an input of a third ATM multiplexer 161 and to an input of a fourth ATM multiplexer 163. The third ATM multiplexer 161 includes a second input which is electrically coupled to the output of the first ATM multiplexer 156. The fourth ATM multiplexer 163 includes a second input which is electrically coupled to the output of the register XOR gate 147 between the fifteenth and sixteenth register positions 128. The output of the fourth ATM multiplexer 163 is electrically coupled to the input of the sixteenth register position 128.

Also, the fourth XOR gate 153 is electrically coupled to an input of a fifth ATM multiplexer 166 and to an input of a sixth ATM multiplexer 169. The fifth ATM multiplexer 166 includes a second input which is electrically coupled to the output of the third ATM multiplexer 161. The sixth ATM multiplexer 169 includes a second input which is electrically coupled to the output of the register XOR gate 147 between the twenty-third and twenty-fourth register positions 128. The output of the sixth ATM multiplexer 169 is electrically coupled to the input of the twenty-fourth register position 128.

Next, the operation of the CRC generation circuit 106 is explained. Serial data is received at the serial data input 119 and is applied to a data input of the first XOR gate 123. The first XOR gate 123 receives a feedback data signal from the feedback MUX 121. The first XOR gate 123 performs a modulo-2 operation on these two inputs, producing an output data signal which is fed into the first register position 128 of the bit shift register 126. Generally, all of the XOR gates discussed herein may be termed a modulo-2 circuit as this is operation they perform. It is contemplated that different circuit components may be used to accomplish the modulo-2 operation, the XOR gates being cited herein as an example of such a circuit. A clock synchronizes the shifting of each register position 128 and the data input to the bit shift register 126 is shifted accordingly.

The data input to the bit shift register 126 is shifted until it reaches the last register position 128 employed in the CRC generation function. The number of register positions 128 used in the CRC generation function is determined by a shift register length selection circuit which mainly comprises the feedback MUX 121. The output of several predetermined register positions 128 are applied to the inputs of the feedback MUX 121. A configuration signal is applied to a feedback MUX control input which selects one of the inputs to be transmitted from the feedback MUX output. In this manner, the length of the number of register positions 128 employed in calculating a CRC data value is determined. According to FIG. 2, the register positions 128 which may be selected as the last register position so employed include positions 3, 4, 5, 7, 9, 11, 15, and 31 which translate into CRC data calculation using 4, 5, 6, 8, 10, 12, 16, or 32 consecutive register positions. Thus the CRC generation circuit 106 provides a distinct advantage in that one circuit is configurable to generate CRC data for multiple data communication protocols which have different CRC generation requirements using bit shift registers with different numbers of register positions employed.

In the calculation of CRC data for a particular protocol, a CRC generator polynomial which is specified for each data communication protocol operates on the data input in the bit shift register 126. The operation of the polynomial is accomplished using the register XOR gates 147 between the register positions 128 which correspond with a particular order of the polynomial specified. For example, if the polynomial is specified as $X^4+X+1$ for an E1 protocol, then the data output of the first XOR gate 123 is XOR'd with the position register outputs of register positions 0, 1, and 3 by using the appropriate register XOR gates 147.

The CRC generation circuit 106 allows a particular CRC generation polynomial to be employed by applying an appropriate polynomial configuration signal (C1–C31) to the particular AND gates 146 which correspond with the exponents of the terms in the polynomial. When the polynomial configuration signal applied to a particular AND gate 146 is a "1", then the output of the particular AND gate 146 is equal to the output of the first XOR gate 123. This output value is XOR'd with the output of the respective register position 128, thereby performing a modulo-2 operation, and the result is sent into the adjacent register position 128. The CRC generation circuit 106 provides a distinct advantage in that it can be configured to perform the CRC calculation function using different CRC generation polynomials from various different data communication protocols.

To summarize then, the CRC generation circuit 106 is configured by generating in the configuration register 103 (FIG. 2) a control signal transmitted to the feedback MUX 121. Also, the particular polynomial configuration signals are transmitted to the appropriate polynomial inputs C1–C31 and the clock gating circuit for the clocks CL0, CL1, CL2, and CL3. In this manner, the number of register positions 128 and the CRC generation polynomial are specified.

The CRC generation circuit 106 provides further advantages in addition to those described above. In particular, the 32 register positions 128 can be spit into four different 8 bit shift registers which act as header error checksum generating circuits to perform an asynchronous transfer mode (ATM) synchronization function. To explain further, in ATM, the basic data frame or ATM cell comprises 53 data octets or bytes. These ATM cells have always a 4 byte header with the address and routing information, followed by an 8-bit CRC checksum which is called a Header Error Checksum (HEC), and then 48 bytes of data payload. These ATM cells are transmitted in an endless, uninterrupted stream, filled with "idle cells" if there is no real customer data to be sent. The only way to find the beginning of such an ATM cell in ATM protocols in order to synchronize the ATM cell stream is by computing the ATM HEC over any consecutive 32 bits or 4 bytes, and then to compare the result with the $5^{th}$ incoming byte. If the values are equal, then that 5 bytes might be the possible header of an ATM cell. To be sure, the next 48 bytes need to be skipped, and then the ATM HEC computation is performed again. In the preferred embodiment, if the circuit can repeat this operation successfully three times, then the ATM cell stream is synchronized. Otherwise a new start-of-cell position is picked randomly, and the testing starts again. This operation is explained in more detail in later text.

In case of DSL communication, the data is already byte-aligned based on the start-up procedure and the DSL framing structure. In that case one single CRC generator as described in the invention can perform four concurrent ATM HEC computations for four independent "assumed" start-of-cell positions, using the same data stream. Using this approach, the time to establish ATM synchronization is shorter than using a single CRC generator, while the hardware effort is less than using four dedicated CRC generators.

In order to convert the function of the CRC generation circuit 106 to perform the ATM synchronization, a common control signal is applied to the first, second, third, fourth, fifth, and sixth ATM MUX's 156, 159, 161, 163, 166, and 169. This common control signal causes the first and second ATM MUX's 156 and 159 to apply the output from the second XOR gate 149 to the AND gates 146 between register positions 8 through 15, and, the output from the second XOR gate 149 is applied to the input of the eighth register position 128. Similarly, the common control signal causes the third and fourth ATM MUX's 161 and 163 to apply the output from the third XOR gate 151 to the AND gates 146 between register positions 16 through 23, and, the output from the third XOR gate 151 is applied to the input of the sixteenth register position 128. The same goes for fifth and sixth ATM MUX's 166 and 169 which apply the output from the fourth XOR gate 153 to the AND gates 146 between register positions 24 through 31, and, the output from the fourth XOR gate 153 is applied to the input of the twenty-fourth register position 128. In this manner, the thirty-two bit shift register is split up into four identical subsections using the same serial data input 119. A control signal is applied to the feedback MUX 121 which applies the output of the seventh register position 128 to the first XOR gate 123. Thus, four eight bit ATM synchronization shift registers result in which the output value from register positions 7, 15, 23, and 31 are applied to an input on the first, second, third, and fourth XOR gates 123, 149, 151, and 153, respectively. The serial data input 119 is applied to the XOR gates 123, 149, 151, and 153 as well.

Thus, by manipulating all of the multiplexers 156, 159, 161, 166, and 169, the thirty-two bit CRC generator is effectively cut into four identical eight-bit CRC generators which operate on the very same input data, but can have completely different register values.

The CRC generation circuit 106 provides a further advantage in that, when configured to perform CRC data generation employing less than the full thirty-two register positions as required by a particular data communication protocol, the remaining unused register positions 128 can be employed for other purposes, such as a register or multiple registers for the temporary storage of data since the configured CRC operation does not require their contribution. To accomplish this, the appropriate clock signal CL0, CL1, CL2, or CL3 which is supplied to each register position 128 is disabled using a gating logic device for the unused register positions 128 so that the unused register positions keep their loaded values independently of the CRC generation operation. Data values may be written to or read from the unused register positions 128 from the data bus 102. As an additional benefit, the disabled clock lines do not dissipate any power and thus contribute to the overall efficiency when implemented using complimentary metal-oxide semiconductor (CMOS) technology.

In addition, the CRC generation circuit 106 provides another advantage due to the ability to read and write values directly to and from the register positions 128 via the data bus 102. In particular, the write option to the CRC registers positions 128 serves two purposes. First, the CRC generation circuit 106 may be employed for two different interleaved data frames. After updating the CRC values for a first data frame, the CRC values can be read through the data bus 102 and stored intermediately in a processor data memory (not shown). Immediately thereafter, the CRC values for the second data frame can be retrieved and written to the CRC register positions 128, updated with additional data for that frame, and then swapped again for the CRC values of the first data frame.

In light of the discussion above, the circuit logic necessary in the configuration register 193 (FIG. 2) necessary to configure the CRC generation circuit 106 is apparent based upon the foregoing explanation and not discussed in detail herein.

Figure 4:
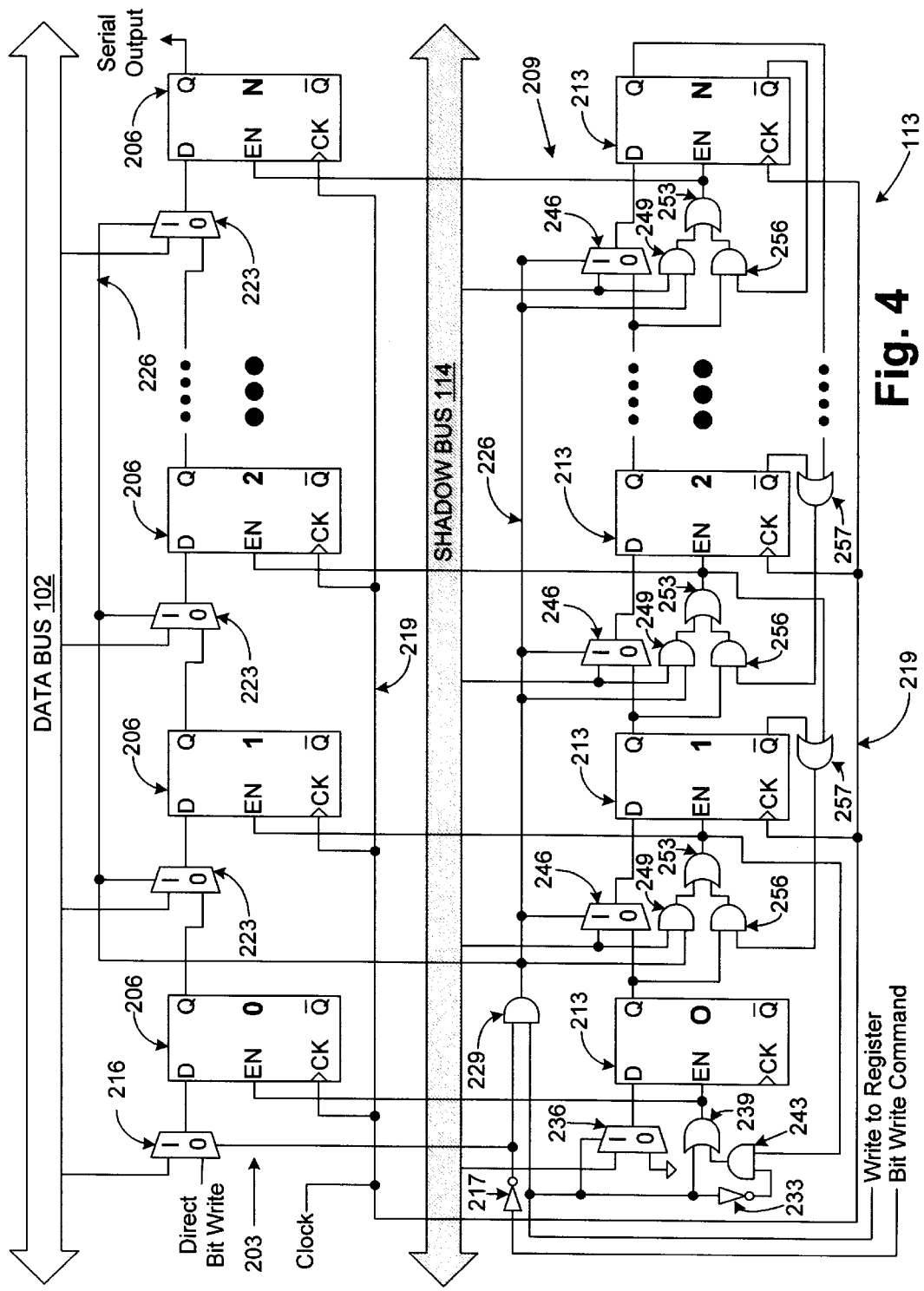
FIG. 4 is a schematic of a first-in-first-out circuit employed in the cyclic redundancy check circuit of FIG. 2.

Turning to FIG. 4, shown is a FIFO register circuit 113 employed by the cyclic redundancy check circuit 100. The FIFO register circuit 113 includes a data register 203 which is comprised of a number of data register positions 206 and a shadow register 209 with an equal number of shadow register positions 213. For purposes of this discussion, the data register positions 206 and the shadow register positions 213 are numbered from 0 to N as shown. In the preferred embodiment, there are eight actual data and shadow register positions 206 and 213, where N=7, however, any number of register positions may be employed. The data register positions 206 and shadow register positions 209 are actually comprised of, for example, positive level static D flip-flops, however, it is understood that other circuit components may be employed in the place of the D flip-flops which will perform the functions of the D flip-flops as shown herein.

Referring first to the data register 203, the input D of the D flip-flop which comprises the $0^{th}$ register position 206 (hereafter "the $0^{th}$ D flip-flop") is coupled to an output of a bit write multiplexer 216. The bit write multiplexer 216 includes a first input coupled to the data bus 102 and a second input coupled to the bit bus 115 (FIG. 2), through which a direct bit write signal is received. The bit write multiplexer 216 also includes a control input which is coupled to the bit bus 115 through a first NOT gate 217, which is triggered by a bit write command from the bit bus 115. The enable input EN of the $0^{th}$ D flip-flop is coupled to the enable input EN of a corresponding D flip-flop comprising the $0^{th}$ register position 213 of the shadow register 209. Note that the enable inputs EN of all D flips flops in corresponding register positions 206 and 213 are coupled together, respectively.

The clock input CK of the $0^{th}$ D flip-flop is coupled to a common clock line 219 which is coupled to the clock inputs CK of all the D flip-flops in the data register 203 and the shadow register 209. The output Q of the $0^{th}$ D flip-flop is coupled to a first input of a data/shift multiplexer 223. The second input of the data/shift multiplexer 219 is coupled to the data bus 102. Additional data/shift multiplexers 219 are similarly coupled between the subsequent D flip flops that comprise the data register positions 206 as shown. Each data/shift multiplexer 219 includes a control input to toggle between the first and second inputs, the control inputs being coupled to a write control line 226. The output Q of the D flip flop at the final $N^{th}$ data register position 206 serves as a serial output of the data register 203 and is coupled to appropriate circuitry.

The write control line 226 is coupled to the output of a write AND gate 229. The write AND gate 229 has a first input coupled to the output of the first NOT gate 217 and a second input coupled to an address/control bus (not shown) through which a "write to register" command is received. The same write to register command from the address/control bus is coupled to the input of a second NOT gate 233, a control input of a $0^{th}$ shadow multiplexer 236, and a first input of an initial OR gate 239. The output of the second NOT gate 233 is coupled to a first input of an initial shift AND gate 243. The output of the initial shift AND gate 243 is coupled to an input of the initial OR gate 239. The output of the initial OR gate 239 is coupled to the enable inputs of the D flip-flips in the $0^{th}$ data register position 206 and the $0^{th}$ shadow register position 213. The $0^{th}$ shadow multiplexer 236 has a first input coupled to the shadow bus 114, and a second input coupled to ground which acts as a logical "0". The output of the $0^{th}$ shadow multiplexer 236 is coupled to the input D of the $0^{th}$ D flip-flop.

The first and second NOT gates 217 and 233, $0^{th}$ shadow multiplexer, initial shift AND gate 243, the write AND gate 229, and the initial OR gate 239 comprise a front end circuit before the $0^{th}$ shadow register position 213. Thereafter, a common circuit is employed between the remaining register positions 213 which facilitates the use of both the data register 203 and the shadow register 209 to write data to, and to shift the data.

This common circuit includes a write/shift multiplexer 246, a write enable AND gate 249, an enable OR gate 253, a shift enable AND gate 256, and a shift OR gate 257. The write/shift multiplexer 246 includes a control input which is coupled to the write control line 226, a first input which is coupled to the shadow bus 114, and a second input coupled to the output Q of the previous D flip-flop. The write enable AND gate 249 has a first input coupled to the shadow bus 114, a second input coupled to the write control line 226 and an output coupled to an input of the enable OR gate 253. The shift enable AND gate 256 has a first input coupled to an output of the shift OR gate 257, a second input coupled to the output Q of the previous D flip-flop, and an output coupled to a second input of the enable OR gate 253. The shift OR gate 257 has a first input coupled to the inverted output $\overline{Q}$ of the current D flip-flop as shown, and a second input coupled to the output of the enable OR gate 253 which is coupled to the enable input of the following D flip-flop as shown, except of the last shift OR gate 257 to the right, which is coupled to the output Q of the last shadow register position 213.

Next the operation of the FIFO register circuit 113 is discussed. The above circuit facilitates either a full parallel write, a partial parallel write, and a single bit write to the data register 203. In all cases, each bit in the data register 203 which comprises valid data receives a logical "1" in the corresponding shadow register position 213. Only those bits in the data register 203 with a logical "1" in their corresponding shadow register position 213 are shifted to the serial output of the FIFO register circuit 113. Both the bits in the data register 203 and corresponding bits in the shadow register 209 are shifted simultaneously.

In the case of a full parallel write to all of the data register positions 206 from the data bus 102, a corresponding full parallel write to the shadow register positions 213 is executed from the shadow bus 114. With a full parallel write, all of the shadow register positions 213 will receive a logical "1" from the shadow bus 114, where a logical "1" is placed on all conductors of the shadow bus 114 unless a partial parallel write is performed.

During a partial parallel write, a full parallel write is performed to the data register positions 206 from the data bus 102 and a full parallel write is performed to the shadow register positions 213 from the shadow bus 114. However, in a partial parallel write, at least one of the data bits written from the shadow register will be a logical "0" which indicates that the corresponding bit in the data register 203 is invalid. In such a case, only valid bits which are part of the partial parallel write are shifted to the serial output of the data register 203.

Finally, a bit write is performed to the left-most data register position 206 and corresponding shadow bit is written to the left-most shadow register position 213 from the bit bus 115. Thereafter, both the data bit and the shadow bit are shifted across the data and shadow register positions until the bit is supplied to the serial output.

First the operation of a bit write is discussed in detail. When a bit write is to be performed, the bit write command is set to a logical "1" or set "high", which causes a low output at the first NOT gate 217 which, in turn, causes the bit write multiplexer 216 to couple the bit write conductor of the bit bus 115 to the input of the $0^{th}$ D flip-flop. In addition, the output of the write AND gate 229 is a logical "0", or is "low" which places the remainder data register positions 206 and shadow register positions 213 in a shift mode where the data/shift multiplexers 223 and the write/shift multiplexers 246 are set to cause the outputs Q of the D flip-flops to be fed into the inputs D of the adjacent D flip-flops as shown. The "write to register" command is set high, resulting in a high output at the initial OR gate 239 which enables the $0^{th}$ D flip-flop, and, a high control signal is applied to the $0^{th}$ shadow multiplexer 236 which applies a shadow bit from the shadow bus 114 to the first shadow register 213 (the $0^{th}$ D flip-flop). Although a logical "1" is placed on all the remaining conductors of the shadow bus 114, only the shadow bit from the first shadow register 213 is enabled to receive the logical "1".

In an alternative explanation of a bit write operation, the leftmost register positions bit of the data and shadow registers 206 and 213 may operation in one of two modes. In the case where a "Bit Write Command" is transmitted, a single data bit from the bit bus 115 is applied through the bit write multiplexer 216 to the leftmost register position 206. At the same time bit seven of the shadow bus 114 is applied through the $0^{th}$ shadow multiplexer 236 to the leftmost register of the shadow register 209. Both leftmost register positions 206 and 213 are enabled through the "Write-to-Register" signal through the initial OR gate 239, so that on the next rising edge of the clock signal 219, the applied data and shadow bits are written into the leftmost registers. At the same time, the "Bit-Write-Command" signal, inverted by the first NOT gate 217 inhibits the write AND gate 229 so that only one single bit is loaded into the leftmost register position 206, and only one single data bit is loaded into the leftmost shadow register position 213. As all bits of the shadow bus 114 are always set to a logical "1" at all times unless a partial bit write is performed.

The shifting function of the shadow register 209 and the data register 203 will cause the valid data bits and corresponding shadow bits written to the data and shadow registers 203 and 209, respectively, to shift to the right (as seen in FIG. 2), until the valid data bits are supplied to the serial output. In particular, after valid data bits are written to any one of the data register positions 206 with shadow bits written to corresponding shadow register positions 213 in a full parallel, partial parallel, or bit write, the "write to register" command is set low. This causes the data/shift multiplexers 223 and the write/shift multiplexers 246 to apply the preceding D flip-flop output Q to the input D of the D flip-flop coupled to the output of the respective data/shift or write/shift multiplexer 223 or 246. In this situation, the data and shadow registers 203 and 209 are said to be in a shift mode. The following discussion is with reference to the D flip-flops in the shadow register positions 213 labeled 1, 2, and N.

Assuming that the data and shadow registers 203 and 209 are in the shift mode, when a shadow bit held by a D flip-flop 2 of the shadow register 209 is a logical "0", then the inverted output $\overline{Q}$ of D flip-flop 2 is set high. Consequently, the output of the shift OR gate 253 coupled to the inverted output $\overline{Q}$ is set high. If the shadow bit held by the preceding D flip-flop 1 holds a logical "1", then the shift enable AND gate 256 is set high, which results in a high output at the enable OR gate 253 and the logical "1" is shifted from the preceding D flip-flop 1 in to the enabled D flip-flop 2.

If while in the shift mode, the shadow bit held by D flip-flop 2 holds a logical "1", the inverted output $\overline{Q}$ of the D flip-flop 2 is set low. When the subsequent D flip-flop N is enabled, the output of the shift OR gate 257 attached to the enable input of D flip-flop N is set high. At the same time, when a logical "1" is seen at the output Q of the preceding D flip-flop 1, then the shift enable AND gate 257 receiving the output Q from the D flip-flop 1 is set high, which sets the enable OR gate 253 coupled to the enable input EN of the D flip-flop 2 high, shifting the shadow bit from D flip-flop 1 to 2, and from D flip-flop 2 to N.

To summarize the above statements, a shadow register position is empty if it holds a logical "0", and is full if it holds a logical "1". A full shadow register position 213 will only receive data shifted from the left when it can shift its shadow bit to the right. However, an empty shadow register position 213 will always receive data to be shifted from the left, but will not shift its logical "0" to the right. Thus, after a bit or a number of bits are written to the data register 203 and the FIFO register circuit 200 transitions from a write mode to a shift mode where the data bits will automatically shift to the right if the adjacent shadow register position 213 to the right is empty, or if the same shadow register position 213 is full and is shifting to the right as well. For the purposes of this application, this automatic shifting nature of the FIFO register circuit 200 is termed a trickle effect. Note that the data bits in the data register 203 are shifted simultaneously along with the shadow bits in the shadow register 209 which maintains a serial data stream at the serial output.

In the cases of a partial parallel and a full parallel write, the "Write to Register" command is set high which causes the initial shadow multiplexer 236, the write/shift multiplexers 246, and the data/shift multiplexers 223 to apply the values on the data bus 102 and the shadow bus 114 to be applied to the inputs of the register positions 206 and the shadow register positions 213. Also, the bit write multiplexer 216 applies the value on the data bus 102 to the input of the leftmost register position 206. Simultaneously, the different bits of the shadow bus 114 together with the decoded "Write to Register" command enable any shadow register position 213 via the write enable AND gates 249 and the enable OR gates 253 where the respective shadow bit is set to a logical "1". In the case of a full parallel write, all of the bits on the shadow bus 114 are set to a logical "1" and all the data bits written to shadow register positions 213 and their corresponding data register positions 206 are shifted to the right as discussed previously.

In the case of a partial parallel write, one or more of the shadow bits on the shadow bus 114 may be set to a logical "0" which results in the corresponding shadow register position 213 and its companion data register position 206 staying in a disabled state. In this case, the disabled shadow register position 213 and its corresponding disabled data register position 206 retain their original values. Thus, after a partial parallel write is executed, only the data bits in the data register positions 206 with a logical "1" in the corresponding shadow register position 213 will be shifted to the right as was discussed above.

Note that the rightmost shadow bit controls the clocks CL0, CL1, CL2, and CL3 for the CRC generation circuit 106 (FIGS. 3A–3D) so that the data bit applied to the output Q of the rightmost register position 206 is processed by the CRC generation circuit 106.

Figure 5:
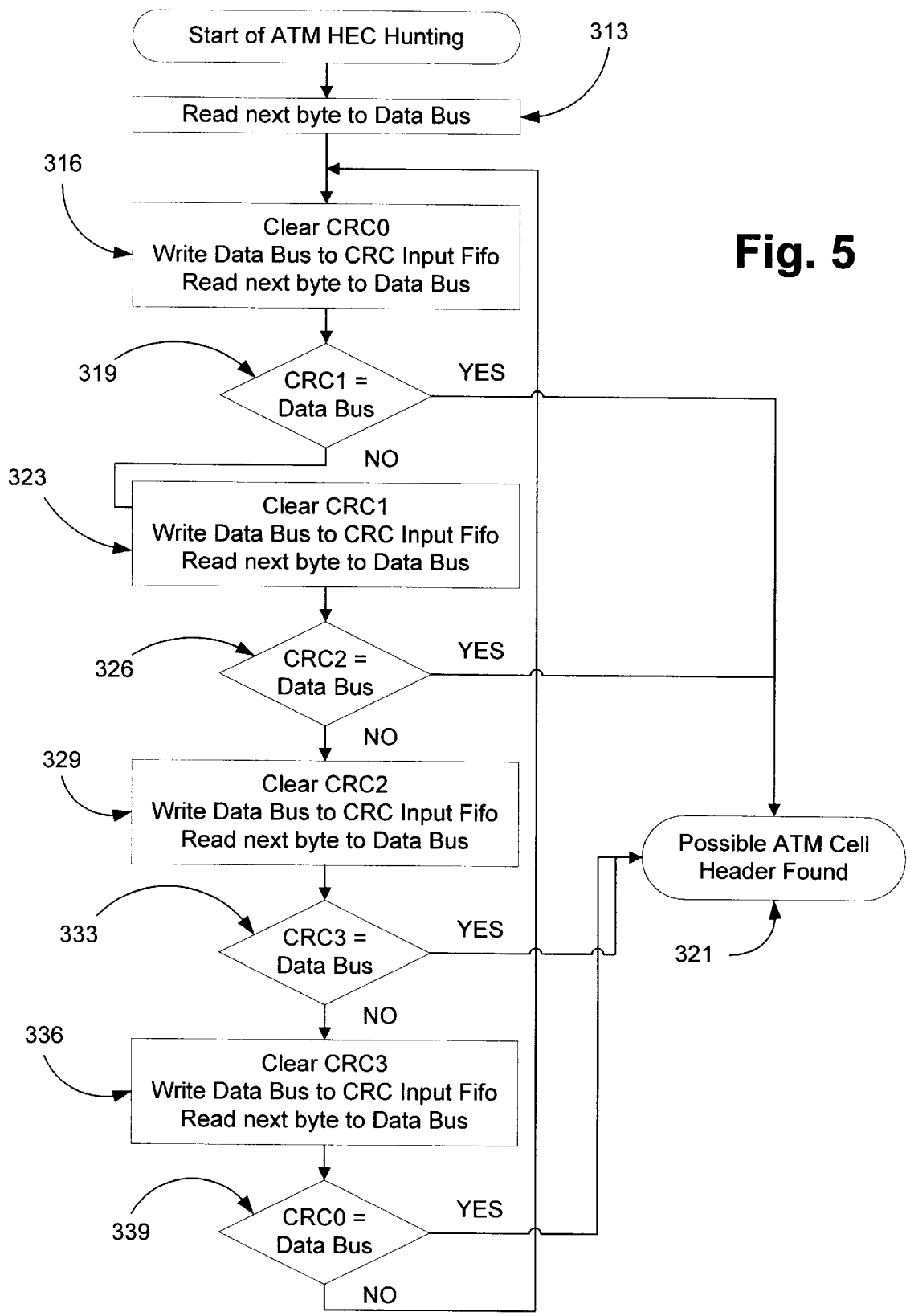
FIG. 5 shows a flow chart which details the ATM synchronization portion of the operation logic 79 shown in FIG. 1.

Turning to FIG. 5, shown is a flow chart which details the ATM synchronization portion of the operating logic 79 (FIG. 1) by which the CRC generation circuit 106. As previously stated, the CRC generation circuit 106 may be split into four 8 bit registers which operate independently. It is also noted that an ATM data cell employs a 5 byte header, where the fifth byte holds a header error checksum (HEC) performed on the first four bytes. The CRC generation circuit 106 may be manipulated according to the operating logic 79 to detect the existence the HEC in an efficient manner. For purposes of the following discussion, the register positions 0–7 are referred to as CRC0, register positions 8–15 are referred to as CRC1, register positions 16–23 are referred to as CRC2, and register positions 24–31 are referred to as CRC2. To perform the ATM synchronization operation, the operating logic 79 begins with block 313 in which an ATM data byte is read to the data bus 102. Next, in block 316, CRC0 is cleared, the ATM data byte on the data bus 102 is read into the CRC input FIFO 113 (FIG. 2), and the next ATM data byte is read onto the data bus 102. Note when an ATM data byte is read into the CRC input FIFO 113, an error checksum calculation is performed in CRC0, CRC1, CRC2, and CRC3.

Next, in block 319, the value held in CRC1 is compared to the current value on the data bus 102. If they are equal, than a potential ATM cell header has been found and the operating logic 79 progresses to block 321. If they are not equal, the operating logic 79 progresses to block 323 in which CRC1 is cleared, the current ATM data byte on the data bus 102 is read into the CRC input FIFO 113, and a new ATM data byte is read onto the data bus 102. Thereafter, in block 326, the value held in CRC2 is compared to the current value on the data bus 102. If they are equal, then once again, a potential ATM cell header has been found and the operating logic 79 progresses to block 321. If not, then the operating logic 79 progresses to block 329.

In block 329, CRC2 is cleared, the current ATM data byte on the data bus 102 is read into the CRC input FIFO 113, and a new ATM data byte is read onto the data bus 102. Thereafter, in block 333, the value held in CRC3 is compared to the current value on the data bus 102. If they are equal, then as before, a potential ATM cell header has been found and the operating logic 79 progresses to block 321. If not, then the operating logic 79 progresses to block 336.

In block 336, CRC3 is cleared, the current ATM data byte on the data bus 102 is read into the CRC input FIFO 113, and a new ATM data byte is read onto the data bus 102. Thereafter, in block 339, the value held in CRC0 is compared to the current value on the data bus 102. If they are equal, then a potential ATM cell header has been found and the operating logic 79 progresses to block 321. If not, then the operating logic 79 reverts back to block 316 in which the foregoing process is repeated.

It is noted that for the first four ATM bytes read into the CRC input FIFO 113, no valid comparison is made as it would take four previously loaded ATM bytes to generate an header error checksum for an ATM header. Thus the first time through, the registers CRC0, CRC1, CRC2, and CRC3 are "primed" with the first four ATM data bytes. Thereafter, every time a subsequent ATM data byte is read into the CRC input FIFO 113, one of CRC0, CRC1, CRC2, or CRC3 will potentially hold an ATM header error checksum which would indicate first byte of the ATM cell. The loop in the operating logic 113 can be performed as many times as desired until a predetermined timeout occurs or a predetermined number of loop iterations are performed and no header error checksum was detected. The circuit thus advantageously allows fast and efficient detection of an ATM header.

Many variations and modifications may be made to the preferred embodiment of the invention without departing substantially from the spirit and principles of the invention. All such modifications and variations are intended to be included herein within the scope of the present invention, as defined by the following claims.

Having thus described the invention, it is claimed:

1. A cyclic redundancy check (CRC) generator circuit, comprising:
   an input first-in-first-out (FIFO) to interface with a data bus;
   a configuration register electrically coupled to the data bus, the configuration receiving a configuration data signal from the data bus; and
   a configurable CRC generation circuit electrically coupled to the data bus, the configurable CRC generation circuit having a shift register with a plurality of register positions, wherein data can be written to and read from the register positions via the data bus.

2. The cyclic redundancy check (CRC) generator circuit of claim 1, wherein the configurable CRC circuit further comprises:
   a first modulo-2 circuit having a data input and a feedback data input, and an output, the output of the first modulo-2 circuit being applied to the shift register; and
   an order selection circuit which determines an order of the CRC generation circuit.

3. The cyclic redundancy check (CRC) generator circuit of claim 2, wherein the shift register length selection circuit further comprises:
   a feedback multiplexer having at least two feedback inputs, a feedback output applied to the feedback data input of the first modulo-2 circuit, and a feedback selection control input to cause one of the feedback inputs to be applied to the feedback selection output; and
   a plurality of predetermined register position outputs being applied to the feedback multiplexer inputs, wherein the number of register positions employed in calculating a CRC data value being determined by a control signal applied to the feedback multiplexer control input.

4. The cyclic redundancy check (CRC) generator circuit of claim 2, further comprising a circuit configured to control an application of any combination of a number of polynomial coefficients to the CRC generation circuit.

5. The cyclic redundancy check (CRC) generator circuit of claim 3, further comprising:
   a gated clocking input to each register position, the clocking input triggering the shifting of data;
   a gating logic device to disable the clocking input to register position not employed in calculating the CRC data value.

6. The cyclic redundancy check (CRC) generator circuit of claim 3, further comprising at least one asynchronous transfer mode (ATM) divider circuit for dividing the shift register into a predetermined number of header error checksum generating circuits.

7. A cyclic redundancy check (CRC) generator circuit, comprising:
   means for receiving a data input from a data bus;
   means for generating a CRC configuration control signal based upon a predetermined data communications protocol; and
   means for generating CRC data based upon the CRC configuration control signal, the CRC data being transmitted to the data bus.

8. The cyclic redundancy check (CRC) generator circuit of claim 7, wherein the means for generating CRC data further comprises:
   first means for performing a modulo-2 operation between the data input and a feedback data input;
   a shift register having a predetermined number of register positions, the output of the first means being applied to the shift register; and
   second means for determining a number of register positions employed in calculating a CRC data value.

9. The cyclic redundancy check (CRC) generator circuit of claim 8, wherein the means for determining a number of register positions further comprises:

a feedback multiplexer (MUX) having at least two feedback MUX inputs, a feedback MUX output applied to the feedback data input of the first XOR gate, and, a feedback MUX control input to cause one of the feedback MUX inputs to be applied to the feedback MUX output; and predetermined register position outputs being applied to the feedback MUX inputs, the number of register positions employed in calculating a CRC data value being determined by a control signal applied to the feedback MUX control input.

10. A cyclic redundancy check (CRC) generator circuit, comprising the steps of:

receiving a data input from a data bus;

generating a CRC configuration control signal based upon the data input using a predetermined data communications protocol; and generating CRC data based upon the CRC configuration control signal, the CRC data being transmitted to the data bus.

11. The method of claim 10, wherein the step of generating CRC data further comprises:

performing a modulo-2 operation between the data input and a feedback data input;

determining a number of register positions employed in calculating a CRC data value in a bit shift register having a predetermined number of register positions; and generating CRC data using the number of a register positions, the output of the first XOR gate being applied to the shift register.

* * * * *